| EXAMPLE | ADHESIVE LAYER MAT. | ADHESIVE LAYER THK. | METAL FILM MAT. | METAL FILM THK. | PROTECTIVE COAT MAT. | PROTECTIVE COAT THK. | ELECT. RESIST. OHMS | TRANSPAREN. (%) | CTD. SIDE RFLT. | UNCTD. SIDE RFLT. |
|---|---|---|---|---|---|---|---|---|---|---|
| 1 | ZnO | 4 | Ag | 32 | — | — | 75 | 75 | 12 | 6 |
| 2 | $Al_2O_3$ | 30 | Ag | 48 | — | — | 28 | 76 | 17 | 12 |
| 3 | $Al_2O_3$ | 8 | Ag | 32 | — | — | 70 | 79 | 12 | 7 |
| 4 | $Ag_2O$ | 3.3 | Ag | 48 | — | — | 40 | 70 | 16 | 7 |
| 5 | PbO | 2 | Ag | 48 | — | — | 36 | 68 | 15 | 6 |
| 6 | PbO | 108 | Ag | 48 | — | — | 30 | 58 | 17 | 10 |
| 7 | GOLD OXIDE | — | Ag | 96 | — | — | 7 | 58 | 37 | 32 |
| 8 | GOLD OXIDE | — | Ag | 48 | — | — | 28 | 76 | 17 | 12 |
| 9 | GOLD OXIDE | — | Ag | 32 | — | — | 70 | 79 | 12.7 | 7.2 |
| 10 | $Cu_2O$ | — | Ag | 96 | — | — | 8 | 57 | 33 | 25 |
| 11 | $Cu_2O$ | — | Ag | 48 | — | — | 36 | 68 | 16 | 7.5 |
| 12 | $Cu_2O$ | — | Ag | 32 | — | — | 100 | 69 | 14 | 5.6 |
| 13 | $Ag_2O$ | — | Ag | 96 | — | — | 10 | 50 | 26 | 17.6 |
| 14 | $Ag_2O$ | — | Ag | 48 | — | — | 40 | 57 | 18 | 7 |
| 15 | GOLD OXIDE | — | Cu | 96 | — | — | 16 | 50 | 25 | 13.2 |
| 16 | GOLD OXIDE | — | Cu | 48 | — | — | 125 | 60 | 16 | 5 |
| 17 | $Cu_2O$ | — | Cu | 96 | — | — | 16 | 49 | 24 | 10.6 |
| 18 | $Cu_2O$ | — | Cu | 48 | — | — | 150 | 61.5 | 16 | 5 |
| 19 | $Ag_2O$ | — | Cu | 96 | — | — | 25 | 39 | 25 | 12 |
| 20 | $Ag_2O$ | — | Cu | 48 | — | — | 130 | 53 | 17.7 | 6 |
| 21 | GOLD OXIDE | — | Au | 96 | — | — | 16 | 68 | 21.2 | 13.7 |
| 22 | GOLD OXIDE | — | Au | 48 | — | — | 42 | 76 | 12.7 | 6.8 |
| 23 | GOLD OXIDE | — | Au | 32 | — | — | 70 | 79 | 11.0 | 6.4 |
| 24 | GOLD OXIDE | — | Au | 24 | — | — | 115 | 80 | 10.7 | 6.4 |
| 25 | GOLD OXIDE | — | Au | 48 | — | — | 20 | 72 | 15.6 | 8.8 |
| 26 | GOLD OXIDE | — | Au | 40 | — | — | 20 to 33 | 78 | 11.5 | 8 |
| 27 | GOLD OXIDE | — | Au | 40 | — | — | 20 to 33 | 79 | 9 | 9.5 |
| 28 | $Cu_2O$ | — | Au | 96 | — | — | 12 | 63 | 21 | 14 |

FIG. 1.

INVENTORS
WILLIAM H. COLBERT
ARTHUR R. WEINRICH
WILLARD L. MORGAN
BY Whittemore, Hulbert & Belknap
ATTORNEYS

LIGHT TRANSMISSIVE ELECTRICALLY CONDUCTING ARTICLE

Filed April 18, 1949 3 Sheets-Sheet 2

| EXAMPLE | ADHESIVE LAYER MAT. | ADHESIVE LAYER THK. | METAL FILM MAT. | METAL FILM THK. | PROTECTIVE COAT MAT. | PROTECTIVE COAT THK. | ELECT. RESIST. OHMS | TRANSPAREN. (%) | CTD. SIDE RFLT. | UNCTD. SIDE RFLT. |
|---|---|---|---|---|---|---|---|---|---|---|
| 29 | $Cu_2O$ | —— | Au | 48 | —— | —— | 35 | 73 | 13 | 7.5 |
| 30 | $Cu_2O$ | —— | Au | 32 | —— | —— | 65 | 76 | 11 | 6 |
| 31 | $Cu_2O$ | —— | Au | 24 | —— | —— | 150 | 79 | 11 | 6 |
| 32 | $Ag_2O$ | —— | Au | 96 | —— | —— | 8 | 60 | 18 | 12 |
| 33 | $Ag_2O$ | —— | Au | 64 | —— | —— | 20 | 68 | 13.2 | 7.2 |
| 34 | $Ag_2O$ | —— | Au | 48 | —— | —— | 38 | 76 | 14 | 9.5 |
| 35 | NiO | —— | Au | 96 | —— | —— | 10 | 64 | 22 | 16 |
| 36 | NiO | —— | Au | 48 | —— | —— | 33 | 68 | 13.2 | 8.6 |
| 37 | NiO | —— | Au | 32 | —— | —— | 80 | 74 | 12 | 6.4 |
| 38 | PdO | —— | Au | 96 | —— | —— | 13 | 62 | 19 | 9 |
| 39 | PdO | —— | Au | 48 | —— | —— | 36 | 69 | 14 | 5 |
| 40 | PdO | —— | Au | 32 | —— | —— | 92 | 72 | 12 | 5.4 |
| 41 | $Al_2O_3$ | 87 | Au | 48 | $Al_2O_3$ | 87 | 60 | 77 | 11 | 6 |
| 42 | $Al_2O_3$ | 14.5 | Au | 48 | $A_2O_3$ | 207.5 | 50 | 70 | 5 | 6 |
| 43 | $Al_2O_3$ | 87 | Au | 48 | $Al_2O_3$ | 87 | 60 | 78 | 8.8 | 9.2 |
| 44 | $Al_2O_3$ | 7 | Au | 48 | $Al_2O_3$<br>$SiO_2$ | 7<br>225 | 30 | 72 | 12 | 6 |
| 45 | $Al_2O_3$ | 14.5 | Au | 40 | $Al_2O_3$<br>$SiO_2$ | 7<br>450 | 36 | 78 | 5 | 5.4 |
| 46 | $Al_2O_3$ | 14.5 | Au | 40 | $Al_2O_3$<br>$SiO_2$ | 7<br>450 | 30 | 76 | 10.6 | 11 |
| 47 | PbS | 3 | Au | 48 | —— | —— | 30 | 72 | 12 | 6 |
| 48 | $Sb_2S_3$ | 3 | Au | 48 | —— | —— | 40 | 75 | 9 | 8 |
| 49 | $PbSO_4$ | 11 | Au | 40 | —— | —— | 35 | 77 | 8 | 7 |
| 50 | FeO | —— | Fe | 48 | —— | —— | 150 | 50 | 22 | 7 |
| 51 | $Al_2O_3$ | 30 | Au | 150 | —— | —— | 2 | 50 | —— | —— |
| 52 | $Cu_2O$ | —— | Ni | 72 | —— | —— | 140 | 50 | 21 | 9 |

FIG. 2.

*INVENTORS*
WILLIAM H. COLBERT
ARTHUR R. WEINRICH
WILLARD L. MORGAN
BY Whittemore, Hulbert & Belknap
ATTORNEYS Feb. 17, 1953 W. H. COLBERT ET AL 2,628,927

LIGHT TRANSMISSIVE ELECTRICALLY CONDUCTING ARTICLE

Filed April 18, 1949 3 Sheets-Sheet 3

INVENTORS
WILLIAM H. COLBERT
ARTHUR R. WEINRICH
BY WILLARD L. MORGAN
Whittemore, Hulbert & Belknap ATTORNEYS

UNITED STATES PATENT OFFICE 2,628,927

LIGHT TRANSMISSIVE ELECTRICALLY CONDUCTING ARTICLE

William H. Colbert, Brackenridge, Pa., Arthur R. Weinrich, North Wilkesboro, N. C., and Willard L. Morgan, Haverford, Pa., assignors to Libbey-Owens-Ford Glass Company, Toledo, Ohio, a corporation of Ohio Application April 18, 1949, Serial No. 88,208

20 Claims. (Cl. 154—2.73)

This invention relates to a light transmissive electrically conductive optical article suitable for use as a lens, a window or a windshield, or the like, which is unique in that it is coated with a highly transparent electrically conducting coating.

The articles comprise a body of transparent glass or other transparent siliceous material having an intermediate transparent adhesive layer directly adhered to the surface, and a thin continuous uniform film of transparent metal directly deposited upon and adhered to the adhesive layer. By such a construction it has been found that not only are the products strongly adherent and durable, but they are of a maximum light transmission and of a very high degree of electrical conductivity when even very thin films of metal are thus used.

The invention further relates particularly to the production of a novel type of windshield or window or other transparent optical article such as a lens or goggle.

Lenses employed in the goggle of a helmet used in cold or freezing weather have always been subject to clouding up due to condensation and freezing of the breath upon the same, and the initial transparency of the glass is rapidly destroyed. In airplanes and other fast moving vehicles such as trains which are moving through cold strata of air, there exists a very serious problem of condensation of moisture, or under more severe conditions, actual ice formation upon the windows of the vehicle. In the case of airplanes the icing of the windows has presented a very serious problem. If heat could be applied to such surfaces during use the objectionable clouding and freezing over might be eliminated but the application of heat as such directly cannot normally be conviently carried out. The articles prepared in accordance with this invention carry an electrically conducting coating thereon which permits the direct generation of heat in contact with the glass, light transmitting windows, or viewing lenses at all points over the surface of such glasses. In the determination of the necessary amount of heat which must be brought to a glass surface to prevent icing, for example in an airplane, it is found that a tremendous amount of heat such as between 2,000 and 4,000 British thermal units per square foot per hour must be supplied. To supply so much energy to a square foot of glass surface continuously requires a very efficient means of producing the heat directly in contact with the glass so that the heat may be carried through the glass to the front surface exposed directly to the cold atmosphere or directly developed on such front exposed surface. This large amount of heat when considered in terms of the amount of electrical energy which must be supplied, for example to a windshield four feet by one foot, runs into some 4,000 watts and from such a figure it immediately becomes apparent that for any conductor to be applied to the surface of the glass to heat the same and supply such an amount of energy, the conductor must be one of a very high degree of conductivity. We have therefore made a choice of a metal as the electrical conductor. However, it will be immediately realized that metals are generally opaque and do not suggest themselves for the production of a transparent coating. Hence, we faced the problem as to whether or not metals could be applied to the transparent supports in sufficiently thick coatings that the necessary heavy electrical currents could be carried while at the same time be sufficiently transparent and thereby preserve the primary objective of the optical window.

Attempts to produce a metal coating upon glass or other siliceous surfaces of a minimum thickness which would permit the generation of the desired degree of heat by carrying suitably heavy currents, indicated that only certain metals might possibly be laid down in thin films of suitable light transmission and a desired degree of electrical conductivity.

Experience has indicated that the electrical resistivity of such an electrically conducting film should be less than 100 ohms per square and at all events, not more than 150 ohms per square. At the same time, experience has shown that for transparent closures such for example as windows, windshields and the like, a light transmission of not less than 50% is essential. In fact, it is a present requirement of windshields that they shall transmit at least 70% of normally incident light. Accordingly, in the present invention the light transparent electrically conducting film is designed to have an electrical resistivity of not more than 150 ohms per square while preserving a light transmission property of not less than 50%, and preferably of not more than 100 ohms and a relatively high light transmission of not less than 70%. Only in the case of the metals gold, silver, copper, iron and nickel could metal films of the required resistance be produced which gave the required transmission of light. When thin partially light transparent coatings of these or other metals were applied by thermal evaporation directly upon glass, it was also found that the very thin coatings were not adhered whatsoever to the glass and could readily be wiped off with the finger. Consequently, no permanent article apparently could be produced. It was then also found that the directly applied thin metal coatings or films did not have the expected electrical conductivity or showed resistances which were very high in view of the known conductivity of such metals in massive conductors.

A further effect also appeared in that the coatings or films of any particular metal such as silver or gold varied in color with the amount of metal applied to the glass and it became apparent that the color effects were developed by a scattering of light due to diffraction effects. This scattering of light to the side also immediately thereby resulted in less direct light being transmitted by the glass so that the visibility of distant objects was thereby cut down. Diffraction of light results from scattering caused by discrete separate particles, and it appears that in the very thin deposits of metal of less than 100 Angstrom units (less than 2 millionths of an inch) the metals were present not as continuous films but as small separate isolated spots.

Thus, coatings of gold in amounts which would have given layers in these thicknesses would be purple, green or red shades and showed electrical resistivity in the millions of ohms.

In view of the foregoing general remarks, it is an object of the present invention to provide a partially transparent electrically conducting optical article.

It is a further object of the present invention to produce an article of the character described but having a resistivity per square of not more than 150 ohms and a light transmission of not less than 50%.

It is a further object of the present invention to provide an article of the class described provided with a partially transparent electrically conducting film of metal.

It is a further object of the present invention to provide an article of the character described provided with a partially transparent electrically conducting film of metal adhered to a surface of the article by a metallic compound, and more particularly, by a metallic oxide, sulphide, halide, or oxidized metallic compound of the sulphur family.

It is a further object of the present invention to provide a highly transparent electrically conducting article provided with an electrically conducting coating of a metal which exhibits an electrical conductivity comparable to that of the metal in its bulk state.

It is a further object of the present invention to provide an electrical conducting film of metal which is substantially uniform in thickness, which is continuous, and which is highly light transparent.

The above and other objects and advantages of our invention will appear from the following description and appended claims when considered in connection with the accompanying drawings forming a part of this specification wherein like reference characters designate corresponding parts of the several views.

Figures 1 and 2 are tabular presentations of a number of specific examples described in the specification.

Figure 6:
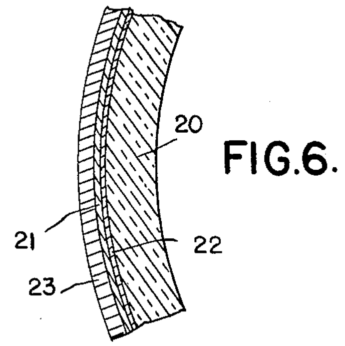

Figure 6. is a fragmentary sectional view through a curve linear lens showing the adhesive layer, metal film and protective coating applied thereto.

Figures 7, 8, 9, 10, 11:
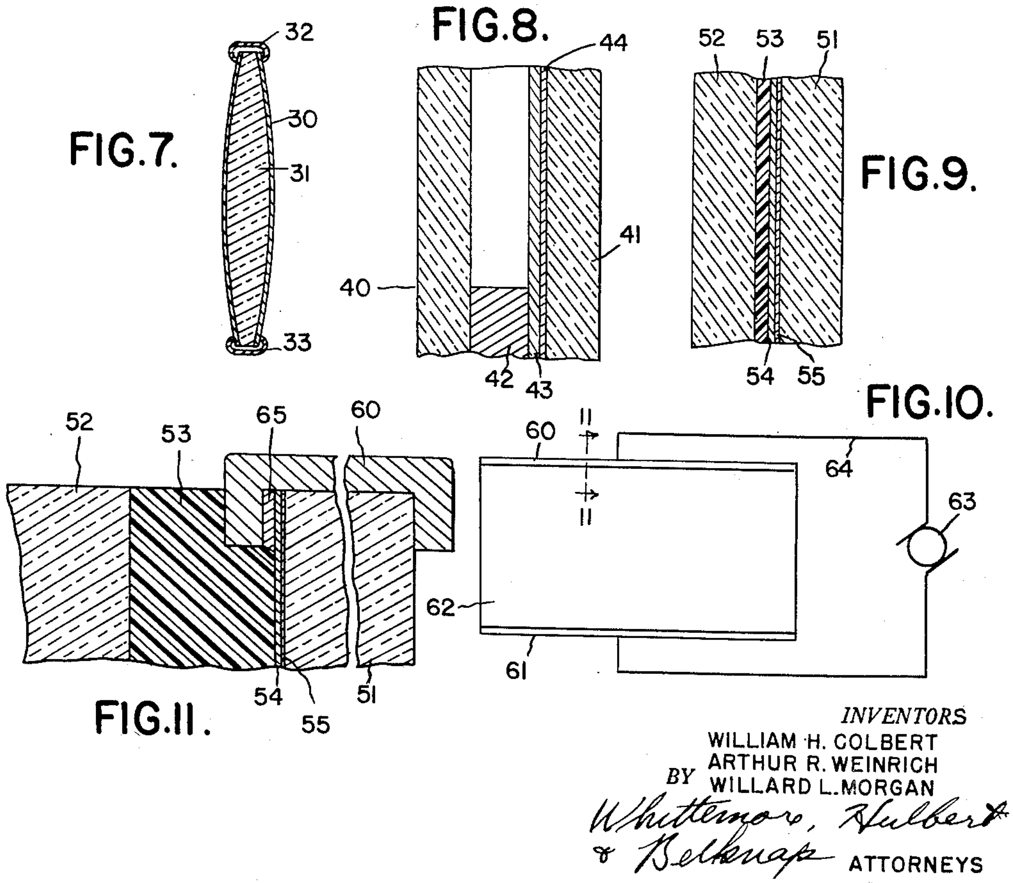

Figure 7 is a sectional view through a double convex lens having a metal conductive film applied to opposite sides thereof, and adhered to the lens surface by a metallic compound adhesive layer.

Figure 8 is a fragmentary sectional view through a double glazed window, one pane of which is provided with the electrically conducting film and adhesive layer.

Figure 9 is a fragmentary sectional view through a laminated glass article such for example as a windshield, one ply of the glass having the metallic conducting film and adhesive layer applied thereto.

Figure 10 is a diagrammatic view illustrating a windshield and showing the manner in which the electrical circuit is completed through the metallic film.

Figure 11 is an enlarged fragmentary sectional view on the line 11—11, Figure 10.

The inventors have found that if the glass or other siliceous surfaces are first coated with an intermediate transparent adhesive layer of a metallic compound such as a metallic oxide, metal sulphide, a metal halide, or a metal sulphate or other metallic compound, and if the above metals, gold, silver, copper, iron and nickel, are thermally evaporated on the precoated support, an entirely different type of metal deposit or film is secured as compared with direct deposits of these metals on uncoated siliceous surfaces. The metal deposit thus produced is immediately characterized by being highly adherent to the precoated support. The metallic compound directly and permanently adheres by molecular forces to the smooth glass or other siliceous surfaces and also acts by strong molecular adhesion to hold the metal film to itself. In such a manner a permanent useful article results; furthermore, the metal deposit secured is entirely different in several ways, resulting from the fact that it is a continuous metal film. In the case of gold the deposit appears by light transmission to be of the characteristic light-greenish yellow gold color and in the case of silver it is of a characteristic clear blue.

The adhesive tendency or attraction of the metal molecules by the metallic compound surface exhibits itself by causing the deposited metal thereon to fasten more or less closely to the spot at which it is applied and thereby causing the formation of a film which is continuous and of uniform thickness. The attraction between the metal and metallic compound atoms is not only an adhering type of action, but is equivalent to a wetting action and the net result is to secure a uniform film resulting thereby from the uniform wetting action of the metal upon the metallic compound.

Along with the above indications that the very thin gold deposit or other metal deposits are of a continuous nature similar to that of metallic gold or the other metals in bulk, there is found that the metal film deposits on the adhesive layers exhibit a very high electrical conductivity comparable to that which would be expected of a continuous film of metallic gold or other metal. Furthermore, the films do not show light diffraction effects causing loss of light by scattering and they have a much higher light transmission for a given weight of metal applied to the article. Thus by the use of a precoating of metallic compound upon the article, it has become possible to form continuous, highly transparent, and highly adherent metal films of less than 150 Angstrom units thickness which are of high electrical conductivity and to produce highly transparent windows, windshields and lenses which may be used under severe cold conditions and heated electrically to avoid the obscuring of the same by either fog or icing.

The unexpected difference resulting upon the deposition of metals in very thin films when deposited directly upon a siliceous surface as compared with the results when deposited upon a similar surface precoated with a continuous layer of a suitable metallic compound would seem to be directly related to the molecular adhesional forces involved in the two separate cases. In thermal evaporation the metal atoms being deposited upon the glass obviously arrive very hot and such heat increases the tendency of the metal to diffuse over the surface upon which it is deposited. Naturally, the small amount of heat carried with the metal atom is soon dissipated but in the instant that the heat resides with the metal while it is on the surface it is in a condition in which it will rapidly diffuse over the surface. As it diffuses over the surface, if it contacts any atoms lying on the surface to which it has a molecular attraction it will obviously be thereby attracted and become fixed. If on the other hand the surface is one without any particular molecular attraction for the metal then the hot metal atom may diffuse rather freely over the surface until it finds another metal atom of similar kind of cooler temperature for which it does have adhesional attraction. The latter happens when metals are deposited upon glass because the metals have no adhesional tendencies to glass, but they do tend to adhere to themselves and thereby build up in small isolated spots of metal. On the other hand, on the metallic compound surfaces there appears to be a definite adhesional attraction between the metals and the metal compound atoms so that as a metal atom arrives and is deposited on such a surface, it stays relatively close to or at the place where it is first deposited and there is immediately thereby built up a continuous uniform coating of the metal. This continuous coating obviously then develops directly from the first atoms applied to the surface.

That there are practically no adhesional forces betwen metals and glass can be seen when adhesive tape is applied directly to metal coatings applied to glass. On stripping the tape the metal will strip off very readily. On the other hand, the articles produced under this invention as well as similar articles where the metal film is of greater thicknesses, will when subjected to the adhesive tape test, successfully resist any pulling away from the glass, showing that there are strong bonds between the metal and the metallic compound, and also between the metallic compound and the glass.

The adhesion of copper, iron, silver, gold, nickel and of other metals to glass, or of other siliceous supports by a layer of metallic compound operates equally well with thicker layers of such metals such as in the forming of reflective articles such as mirrors or electrical resistances as is more particularly shown in Serial No. 541,964, now Patent No. 2,482,054, of which this invention is a continuation in part.

We have found that the metallic oxides such as those of lead, silver, aluminum, magnesium, nickel, zinc, thorium, and other rare earth metal oxides, and the oxides of cadmium, antimony, bismuth, mercury, copper, gold, platinum, palladium and other heavy metal oxides, when applied over glass or other siliceous surfaces, are extremely highly adherent to such surfaces and that furthermore they are highly adherent to the metals which may be applied thereto by thermal evaporation, for the purposes of securing our coated articles. We have also found that other metallic compounds may be used as adhesive layers between the metal film and a silica-containing surface, such as glass. Thus, as metallic compounds that are generally highly effective, we may use the sulphides, sulphates, selenides, selenates, tellurides, tellurates, fluorides or other compounds related to the metallic oxides which we have indicated above and derived from the indicated metals. While with ordinary metallic mirrors made by depositing heavy metal films by thermal evaporation directly upon glass the coatings can readily be removed from glass by applying adhesive tape to the same and pulling this off, it is found that with our new coated articles, the adhesive tape will not pull the metal films away from the glass because they are so tightly adhered to the same by our intermediate thin adhesive layers regardless of whether the metal films are very thin as the transparent electrically conducting articles disclosed herein, or relatively thick as in mirrors, etc.

The metallic oxide or other metallic compounds applied as adhesive films need be, and in some cases preferably are, very thin, being only a few molecules thick in some cases and not visible or otherwise detectable. We have found that the thickness of layer necessary to develop adhesive forces and to present a surface for forming thereon a continuous metallic film deposit, needs to be only a few molecules thick and as such the presence of these compounds on the glass may not be detectable by any optical effect. Thus, where we use any one of a series of different extremely thin films of oxides or other compounds for the purpose of securing our highly light transmitting adherent electrically conducting articles produced by depositing a certain metal such as silver or other suitable metal at a constant thickness on the glass first covered with the very thin metallic oxide film, it has been found that all are equal in reflectivity and in light transmission regardless of the particular very thin oxide or other metallic compound adhesive film employed. However, we may also use thicker metallic oxide or metallic compound films as an adhesive layer which may even be detected by the slight color they impart to the glass and which may also cut down the transmission of light to some degree in the final produced article.

The metallic oxide or metallic sulphide or other metallic compound adhesive layer may be deposited as a coating on the glass by the direct thermal evaporation under normal atmospheric conditions or within a vacuum, of small amounts of the desired metallic compound. As examples of the compounds we may directly evaporate onto the glass surface by thermal evaporation within a vacuum, we may use lead oxide, cadmium oxide, zinc oxide, zinc sulphide, lead sulphide, antimony sulphide, antimony oxide, aluminum oxide, lead bromide, magnesium fluoride, or silver chloride. This forming of the metallic compound film may also be carried out in accordance with the disclosure of prior copending applications, Serial Nos. 541,965, 645,939, 783,841 and 88,188, the latter of which is filed concurrently herewith. Applications Serial Nos. 541,965 and 645,939 have now been abandoned Application Serial No. 783,841 has now issued as Patent No. 2,578,956, and application Serial No. 88,188 is still pending.

In the case of oxide layers, we may produce these in position on the glass by oxidation of extremely thin metallic layers first deposited thereon by thermal evaporation. Thus, we may first evaporate very small amounts of aluminum, tin, lead or copper and then form these into the metallic oxides while on the glass surface by oxidizing these in the vacuum chamber by electrical glow discharge in the residual air. We may readily form coatings of lead sulphate on glass by first evaporating extremely small amounts of lead sulphide and thereafter oxidizing this on the glass to lead sulphate by exposure to the air or by a similar glow discharge. Thin coatings of oxidizable metals or other oxidizable materials such as the metallic sulphides may also be converted to oxidized metallic compounds by heating the glass precoated with the oxidizable metal or metallic compound in a furnace to a high temperature in the presence of oxygen.

A further way in which thin layers of metallic oxides may be produced in position upon a glass or other support prior to the subsequent deposition of a metal film thereupon is to proceed by first applying a thin coating by sputtering a metal in a residual vacuum suitable for sputtering in which the residual vacuum comprises in part oxygen such as from evacuating an air filled vessel. This sputtering may be carried out in means well known in such art employing the metal to be sputtered as an electrode and in some cases where a metallic evacuation chamber is employed, a coating of the metal on the chamber walls may be used as one of the electrodes. The latter is particularly advantageous where an A. C. rather than a D. C. current is employed. In such cases the other electrode would preferably also be of the metal desired to be sputtered. It has been found that where the metal to be sputtered is of an oxidizable nature that the deposit when sputtered in the presence of oxygen is not metal but metal oxide. Thus if copper or nickel is sputtered in the presence of residual air, copper oxide or nickel oxide deposits are formed upon the glass, and the coatings thus produced are extremely adherent to the glass. Furthermore, if the same metal or another metal is then deposited by thermal evaporation as a metallic film upon such precoated glass the metal film is found to be highly adherent to the pretreated glass, in contrast to its normal condition of no adherence when deposited directly upon the untreated glass. Surprisingly also, when the metals silver, gold, platinum and palladium are sputtered in a residual air evacuated system, it is found that the deposits are to a very large degree composed of oxides of these metals. These would seem to be formed from the exposed atoms while they are still slightly warm at the time of deposition or immediately thereafter by bombardment with ozone which is formed in the glow discharge and which is always present at the same time sputtering is carried on in the presence of oxygen. Thus, in the case of sputtering of the metals gold, silver, platinum and palladium, the deposits formed are found to be very adherent which is not true for very thin coatings of such pure metals as shown when they are applied by thermal evaporation where the same are readily wiped off by rubbing the finger across them. In the case of sputtering silver for example, it is found that when a coating has been built up which is so thick that it has only a light transmission of less than one-half of one percent, that the electrical resistance which should be very low for such a thick film, is of the order of 1,400,000 ohms per square. Further, on looking through such a film the color is a deep amber whereas the color of pure silver metal deposited on glass by thermal evaporation or chemical deposition is of a pure blue color. Furthermore, the front surface reflectivity of such an opaque sputtered deposit is found to be only 20% which contrasts with pure silver coating reflectivity of 94%. It is apparent that the deposit is not silver but is silver oxide which is of an amber shade by transmission, is poorly electrically conducting, is adherent to glass and is light absorptive and not particularly light reflective. It is also apparent that by sputtering alone silver could thus not be employed to form a transparent electrically conducting article of anything like comparable properties. In contrast, when silver is sputtered in a residual hydrogen atmosphere, it is found that the deposit secured appears blue by transmission but readily wipes away from the glass with the finger. Further, the deposit in this case is indicated as being silver metal additionally by a relatively high electrical conductivity and light transmission and reflectivity. For example, in one case, a coating produced by sputtering silver in hydrogen showed an electrical resistance of 70 ohms with a light transmission of 38% and a front surface reflectivity of 32%. A heavy film produced in the same manner showed an electrical resistivity of 16 ohms, a lesser light transmission of 25%, and a front surface reflection of 78%.

Deposits formed by sputtering platinum in residual air are of a brown-black nature by light transmission, and in the case of a deposit showing approximately ½% light transmission the electrical resistances were found to be within a range of 18,000 to 65,000 ohms with a front surface reflection of 30%. These deposits which would seem to be a mixture of platinum and platinum oxides contrast with a film deposited by sputtering in hydrogen which shows a front surface reflection of 33% and a light transmission of 30%. This film, sputtered in hydrogen, was of a bluish-gray color when viewed by transmitted light and was not at all adherent. The electrical resistivity of this latter film varied from 600 ohms to 4,000,000 ohms showing that while it was mostly metal it was an unconsolidated spotty type deposit just as was found to be true with the silver sputtered in hydrogen. Similarly, with gold, the deposits formed by sputtering in residual air were tight and of a dark blackish-brown color. An example of such a film showed 21% light transmission, 36% front surface reflectivity, and 28,000 ohms per square electrical resistance. These figures clearly indicate the deposit to be a mixture of gold and gold oxides. When gold is sputtered in hydrogen the deposit is not at all adherent, is of better electrical conductivity at a given light transmission, but is in such properties far poorer than the consolidated continuous films of gold which are secured by the methods of this invention. The deposits sputtered in hydrogen take on the same general characteristics as those of the directly thermally evaporated gold deposits on glass; namely, they show various colors depending upon the relative sizes of the gold spots formed on the glass, whereas the products produced by this invention show only the clear yellow-green color of gold when they are viewed directly therethrough. Furthermore, the products of this invention made with gold show only the clear gold color by reflection whereas the deposits made, either by thermal vacuum evaporation or sputtering in hydrogen directly on uncoated glass with gold show purple, green, blue or red colors by reflection and show scattered light effects by reflection. The colors of these films originate from diffraction effects as determined by the particle size of the individual gold spots.

The sputtered metal oxide adhesive layers necessary for use in securing the high adhesion characteristic of our products and necessary for presenting a surface upon which the very thin thermally evaporated metal film layers will deposit as continuous coatings, need be, like any of our other adhesive precoat layers, only a few molecules thick and there need not be any visible coating apparent upon the glass pretreated by the sputtering process. Provided the metal oxide is formed by a sputtering treatment in a residual air atmosphere, the final product will be satisfactory even though the preliminary sputtered coating is completely otherwise unapparent. In other words, the sputtered coating can be in some cases, detectable only by the result it produces; namely, of good adhesion and of presenting an entirely different type of metal deposit on the treated glass.

In forming an electrically conducting article in which the electrical conducting film is so extremely thin, it obviously becomes very necessary that the coating be extremely uniform in thickness as otherwise slight variations in thickness will result in variable electrical conductivity and development of greater heating at points of minimum thickness. Such development of hot spots quickly leads to burning out of such a film. In order to secure the necessary smooth continuous and uniformly thick metal conducting film, we prefer to deposit the same upon the glass which has been precoated with a metallic compound by depositing the metal film by thermal evaporation. Such a method when the metal is evaporated from filaments properly spaced and loaded, offers a method of securing extremely uniform thin coatings. Furthermore, the precoating of the glass with the metal compound also leads directly to forming the subsequent film deposition in a uniform manner, and without such precoating it would not be possible to secure anything like the necessary uniformity of film thickness due to the tendency of the molecule of metal to gather into groups or clusters on glass which has not been precoated. The difficulties in obtaining the high degree of uniform thickness required will be appreciated when it is realized that the metal films being employed as the transparent electrical conductors are of a thickness ranging from 5 to approximately 50 molecules thick. The articles made by the methods of this invention readily withstand voltages of 110, 220, and 440 volts without any tendency to break down by hot spotting when the articles are used under cooling conditions. It is apparent that the metal film might be deposited also by other means upon the siliceous support precoated with the metallic compound, such as by chemical deposition, and products resulting from such methods are included within the scope of the present invention; however, we prefer the thermal evaporation method of depositing the metal film. Likewise a metal film, which while not as desirable in some ways as the vacuum deposited film, could be deposited upon a precoated surface by a sputtering operation in hydrogen or inert atmosphere.

We have already indicated that the metal which we use in forming our metal film must be capable of carrying extremely high electrical currents in very thin films and at the same time be relatively highly transparent and thereby is immediately restricted to only a few metals, and we have so far found only gold, silver, copper, iron and nickel to have the requisite combination of properties. It further becomes apparent that when we desire to make a window we also wish to avoid developing any reflection properties in such window particularly as for example in an automobile windshield where action of the windshield as a mirror would be highly undesirable. Furthermore, it is obviously desirable that as the metal films are extremely thin, they should be highly resistant to any chemical change such as oxidizing by the air or tarnishing. Silver is somewhat objectionable because of the tendency to tarnish and by reason of its higher reflective properties. On the other hand, good products can be made as will appear in the examples, and in the case of making heated snow goggles a silver film offers a preferred form. Films made with silver or copper which readily oxidize, may and preferably are, protected against subsequent change by the application of further coatings for protection or more particularly, by laminating the treated glass into a composite glass structure. We are able to use nickel in forms of our product in some instances where the light transmission is desired as not too high, as in the snow goggle. Generally however, where we are interested in securing high light transmission as in windshields, windows and optical lenses, we find gold to give us our preferred products, as a result of the gold films at a given thickness having the highest light transmission with the highest electrical conductivity and at the same time, the lowest light reflection properties, and further by reason of its complete inertness to oxidation or chemical change.

While we have indicated certain metals as perferred in the formation of light transparent electrically conducting film, it will be appreciated that in cases where the relatively high ratio of light transmission to electrical conductivity is not such an important factor, other metals than those enumerated above may be employed. In general, it may be said that the metal employed in the film should have relatively high electrical conductivity and relatively high light transmission properties in thin films.

The partially light transparent articles constructed in accordance with the disclosure herein exhibit very great resistance to separation of the metal film from the support body and a surprising resistance to abrasion, and this is accomplished without in any way detracting from optical properties. In the foregoing, mention has been made of the fact that the adhesive layer is deposited upon a smooth surface of a support body. In this connection it may be stated that the term "smooth surface" is used in its ordinary sense and need be only sufficiently smooth to prevent visible or optically apparent light diffusion at the surface and surfficienly smooth to insure the avoidance of electrical hot spots by presenting a base upon which the metal film can be formed in a sufficiently uniformly thick layer. However, the present invention contemplates that the specific smoothness of the surface of the support body will be reproduced in the outer surface of the adhesive layer and will also result in interfaces at opposite sides of the adhesive layer between the adhesive layer and the support body and between the adhesive layer and the metal film of substantially the same smoothness as the smoothness of the smooth surface of the support body. Thus if the smooth surface of the support body is polished to have an extremly smooth finish, this finish will be reproduced in the interfaces between the adhesive layer and the support body, between the adhesive layer and the metal film, and also at the outer surface of the metal film. Accordingly, the present invention results in an article which transmits light in a manner to show no additional visible light diffusion due to the provision of the intermediate bonding layer. If the critical surface or surfaces of the support body are highly polished, both of the interfaces at opposite sides of the adhesive layer will exhibit substantially the same property of smoothness and in addition the outer surfaces of the metal film will exhibit substantially the same property of smoothness.

Since the adhesive layer is deposited on a smooth surface of the support body, and the metal film is deposited on the smooth surface of the adhesive layer without the possibility of intermingling or mechanically interlocking in either case, and since the possibility of chemical reaction between the solid adhesive layer and the solid vitreous siliceous material and the solid metal of the film is eliminated, it is apparent that the extremely effective adhesion obtained is primarily the result of inherent molecular forces of attraction between the materials.

So that there can be no misunderstanding as to the use herein of the term "glassy siliceous material" as a transparent support, we submit below a definition of this term:

The adhesive effects are secured upon silica, silicates, such as mica which contain silica, aluminium silicate or calcium silicate surfaces, and upon the various types of glass which contain different amounts of silica. Thus, with the lead glasses which have 30 to 60 percent silica, with the optical glasses of 50 percent silica or more, the ordinary lime glasses of around 65 to 75 percent silica, and with the borosilicate glasses of as high as 80 percent silica, we secure equally as good results as are found with pure silica. All of these in transparent form provide suitable support bases to which metallic films may be adhered by use of our metallic compounds.

It will be appreciated that the electrical resistances given in the following examples and mentioned throughout this specification are given as ohms per square area and that such electrical resistivities are as usual, the reciprocals of electrical conductivity, thus, the lower the electrical resistance the better the electrical conductivity, and if a film has an electrical resistance of 100 ohms per square it has such a resistivity regardless of whether the square is one inch on the side or one foot on the side. In applying the products of the invention to specific applications the desirability of securing very low electrical resistance or high electrical conductivity becomes emphasized in the choice of voltage at which the electrically heated window or lens, etc., must be operated in order to provide such energy. The voltage E required to supply a given amount of energy W to a square of treated glass one square foot in area, when the current is applied to a square of glass, can be determined by the following simple formula in which R is indicated as the electrical resistance.

$$E=\sqrt{WR}$$

Furthermore, within the limits permitted by a specific application, it is of course best to maintain a window to a minimum width in one direction since by elongating in the other and attaching the electrodes along the long edges, one secures the advantages of having a number of resistances thus connected in parallel.

Thus in the case of an airplane it has been estimated that it is necessary to supply between 2,000 and 3,000 British thermal units per square foot per hour, or an average of 800 watts per square foot to the window to prevent icing. If 800 watts per square foot are to be generated within a glass having a resistance of 100 ohms when current is passed across a one square foot piece, the voltage required would be 283 volts. Since in moving vehicles it is highly advantageous to avoid electrical circuits which involve high voltages due to the danger inherent in accidents or particularly inherent in short circuits developing in wet weather, it becomes highly desirable that any electrically conducting glass to be used in a moving vehicle be not substantially of greater resistance than this figure, and in all events have a resistance per square or not more than 150 ohms, and in general it is desirable for the resistance per square to be at a lower value to thereby permit operation with reduced voltages. It will be obviously apparent that the requirements for heat upon an automobile or train windshield would be far less than that required for an airplane, estimates ranging from 50 to 75 watts per square foot, and that consequently the articles of this invention may be employed upon such vehicles at reasonable voltages.

With a man walking in a minus 60 degree Fahrenheit temperature with a helmet employing a lens of the invention of three square inches, the heat demand to prevent fogging and icing has been estimated at around 1 watt per square inch. With such a lens of square shape and 1.7 inches on a side and 10 ohms resistance, a voltage of only 6 volts is necessary, which may conveniently be supplied by a small dry cell battery or hand operated generator.

Figure 3:
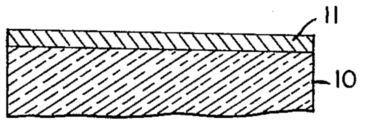
Figure 3 is a fragmentary section through a portion of an article showing the adhesive layer applied thereto.

Referring now to Figures 3–11 there are illustrated certain aspects of the present invention. In Figure 3 there is illustrated a body of glassy siliceous material at 10 to which a precoating of a layer of a metallic compound 11 is applied. The layer 11 may be any of the precoating adhesive layers described in the foregoing.

Figure 4:
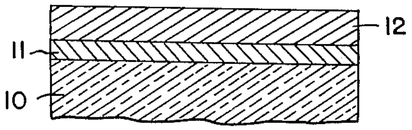
Figure 4 is a fragmentary sectional view through an article illustrating both the adhesive layer and the metal film applide thereto.

In Figure 4 the body 10 is illustrated after the application of a metal film 12 thereto, the metal film 12 being highly electrically conductive and highly transparent and strongly adhered to the glassy siliceous body 10 by the adhesive layer 11.

Figure 5:
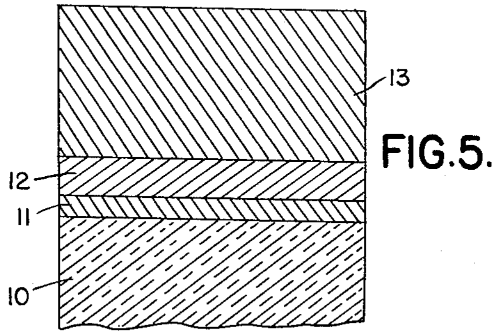
Figure 5 is a fragmentary sectional view through an article illustrating the adhesive layer, the metal film and a protective coating applied thereto.

In Figure 5, the body 10 is illustrated with a protective coating 13 applied to the exposed surface of the metal film 12, the latter being adhered to the glassy siliceous body by the adhesive layer 11. The protective coating 13 may be any of those specifically described in the examples which follow, as for example, silica or aluminum oxide or magnesium fluoride.

In Figure 6 there is illustrated the application of the transparent electrically conducting film to a goggle 20, the film being indicated at 21 and adhered to the glassy siliceous material of the lens 20 by an adhesive layer 22. In this case, there is illustrated at 23, a protective coating applied over the exposed surface of the metal film 21, the protective coating being any suitable material such as those disclosed in connection with the protective coating 13 illustrated in Figure 5.

In Figure 7 there is illustrated the application of the metallic conducting films 30 to both sides of a double convex lens 31. It will be understood that in this case the metal films are adhered as in the previous examples, to the glassy siliceous material of the lens 31 by suitable adhesive layers (not shown). In this figure there are also illustrated electrical contacts 32 and 33 for supplying current to the electrically conducting coatings. It will be understood that the contacts 32 and 33 are provided in the form of arcs of circles having portions extending in area contact with peripheral portions of the metal film, and that the contacts 32 and 33 are separated from each other and that the current is completed between the contacts 32 and 33 through the metal films 30.

In Figure 8 there is illustrated a portion of a double glazed window comprising panes of glass 40 and 41 connected along two opposite edges by metallic spacers 42, the spacers at the other two edges being of dielectric material. The glass 41 is illustrated as having applied thereto a transparent metal conducting film 43 which is adhered to the inner surface of the glass 41 by an adhesive layer 44. Electrical current is applied along opposite edges of the metal film 43 by suitable contacts which may be constituted by the metal spacers 42.

In Figure 9 there is illustrated a windshield of the well known safety glass construction which comprises outer and inner sheets of glass indicated at 51 and 52 respectively. These sheets of glass are assembled together into a sandwich with an interposed layer 53 of a suitable plastic material such for example as polyvinyl butyral or other plastic of approximately a preferred refractive index of about 1.5. By the choice of plastic of such approximate refractive index, it is found that the reflection from the coated surface is decreased upon lamination. The transparent metal conducting film 54 is adhered by a suitable metallic compound adhesive layer 55 to the inner surface of the glass sheet 51. With the parts in the relationship illustrated in this figure, the windshield is designed for use with the glass sheet 51 as the outer or forward sheet of a windshield.

Referring now to Figure 10 there is diagrammatically illustrated the manner of providing an electric circuit for a windshield. In this case elongated contacts 60 and 61 are provided along the long edges of the windshield 62, it being understood that the windshield 62 is provided with a transparent electrically conducting metal film such as that illustrated at 54, in Figure 9. An external source of current is indicated at 63 for connection by conductor 64 to the contacts 60 and 61, thus causing the current to traverse the metal film of the windshield.

In Figure 11 there is illustrated a section of Figure 10 showing the manner of attachment of a contact 60 to the electrically conducting film 54 which may be that illustration in Figure 9. In this case, the metal film 54 is adhered to the glass sheet 51 by the adhesive layer 55. The glass sheet 51 is assembled with the glass sheet 52 by the intermediate ply of plastic 53 as above described. In order to provide a good contact between the contact element 60 and the metal film 54, additional metal is provided as indicated at 65. This may be done by additional thermal deposition of material along the edges of the article or it may be applied otherwise, such for example as by spraying. The contact 60 which may be a strip of thin copper, has one edge embedded in the plastic material 53 and is retained in firm pressure contact with the metal 65 in the final assembly. The electric leads to the source of current may be applied to the contact 60 at the face of the glass.

*Example 1*

A quantity of 0.002 gram of zinc was evaporated from a tungsten filament in a vacuum onto glass placed 14 inches away from the tungsten burner. Oxygen was then introduced to provide a pressure between one millimeter and 0.02 millimeter, and electric glow discharge was set up between an alumnium electrode in the center of the chamber and the walls of the chamber, by the application of 5,000 to 30,000 volts of electricity at approximately one to five. After a few minutes' operation of the glow discharge, the extremely thin deposit of zinc was converted into a zinc oxide layer of about .0004 micron or 4 Angstrom units thickness. Silver was then evaporated from a second tungsten filament after increasing the vacuum and after a sufficient amount of silver had been deposited to form a film of 32 Angstrom units thickness, the coated glass was found to be directly applicable for use as an electric resistance by attaching suitable conducting leads to this silver film. The window article produced as just described was found to have a high degree of adhesion secured between the glass and the metal. As its light transmission was 75% and the light reflection from the coated side was 12% and only 6% from the other side, and it had only a very slight bluish gray tinge, it appeared generally quite like an ordinary window and served excellently as such when instilled directly as a household window, or as a side or rear window or as a windshield in a vehicle such as an automobile, airplane, train or boat. The window could easily be heated by passage of current therethrough as it had an electrical resistivity of 75 ohms per square. In such uses the silver coating was preferably coated with a transparent varnish to prevent change by tarnish or better, the coated pane was laminated to another sheet of glass to achieve an excellent stable article.

*Examples 2 and 3*

In a further example in which a silver conducting film was employed, 0.007 gram of aluminum was evaporated within a vacuum from a tungsten coil onto glass set at 12 inches from the tungsten coil and at 24 inches away. These aluminum deposits were then converted into aluminum oxide in the vacuum chamber by glow discharge for five minutes in an oxygen atmosphere as described in the just preceding example, and as more particularly set forth in co-pending applications, Serial Nos. 541,965 and 541,966, both of which are now abandoned. These aluminum oxide layers thus formed would appear to be about 30 and 8 Angstrom units thick. The vacuum pumps were then again started and after securing a vacuum of $10^{-5}$ millimeters, there was evaporated from other tungsten coils or filaments an amount of silver sufficient to give on the glass closest to the filament a coating of 48 Angstrom units. This was then covered and further silver evaporated to give a film of 32 Angstrom units of silver on the other glass. In each case good adhesion of the silver was secured, the deposits not being removed from the glass by adhesive tape in contrast to the easy stripping secured with a direct silver deposit on the glass. Windows, windshields, or goggle lens thus produced showed in the construction employing the 30 Angstrom units thickness of aluminum oxide and 48 Angstrom units thickness of silver, an electrical resistance of 28 ohms, a light transmission of 76%, a reflection from the coated side of 17%, and a reflection from the other side of 12%; while the other coated product having an 8 Angstrom units adhesive layer of aluminum oxide and a silver film of 32 Angstrom units had an electrical resistance of 70 ohms per square, a light transmission of 79% and reflection values of 12% and 7%.

*Example 4*

An electrically conducting coated lens was made by first evaporating within a high vacuum 0.011 gram of silver onto a glass placed 24 inches away from the tungsten filament. This gave a silver layer 2.2 Angstrom units thick or .00022 micron thick. The silver was then converted into an invisible silver oxide layer by introducing air up to a pressure sufficient to permit an electrical glow discharge to occur within the vacuum chamber. After several minutes' operation of the glow discharge the silver layer was converted into silver oxide. Thereafter the chamber was again highly evacuated and from other tungsten filaments sufficient silver was evaporated to give a continuous uniformly thick silver film of 48 Angstrom units thickness. This silver film showed extremely high adhesion and the coating could not be removed from the glass by adhesive tape. The adhesive layer of silver oxide thus used is only 1 to 2 atoms thick, being approximately 3.3 Angstrom units thick. Obviously, the thickness of this layer is negligible compared to the dimensions of visible light rays which in the yellow measure 5000 Angstrom units. Consequently, it is not surprising that such a deposit as was used in this example had no optical effect, while exerting a desirable high increase in adhesion and permitting the securing of a uniform and continuous film of silver. The resultant product had an electrical resistance of 40 ohms per square, a light transmission of 70%, and reflectivities of 16 and 7% from the respective coated and uncoated sides.

*Example 5*

An electrically conducting glass was made by first evaporating 0.0082 gram of yellow lead oxide from a tungsten filament onto a piece of glass 24 inches away within a vacuum chamber. The lead oxide thus evaporated directly in a high vacuum of about $10^{-3}$ millimeters, or better, gave a layer on the glass approximately 2 Angstrom units thick. This coating could not be seen nor did it affect the light transmission of the glass. A film of 48 Angstrom units thickness of silver was then thermally evaporated in the same vacuum directly upon the coated glass. The resultant product showed a high degree of adhesion and a uniform continuous film of silver. It had an electrical resistance of 36 ohms, a light transmission of 68% and reflectivity from the two surfaces of 15 and 6%.

*Example 6*

Whereas the lead oxide layer used in the last example was invisible, a lead oxide layer of 108 Angstrom units similarly produced in a vacuum chamber by the direct evaporation of lead oxide upon the glass was visible as a very slight yellowish tinge upon the glass. Thus the lead oxide layer did show directly, evidence of light absorption. A silver film of 48 Angstrom units evaporated in the vacuum upon the lead oxide coated glass, gave a product differing slightly from the preceding example in its light transmission characteristic. The product showed an electrical resistance of 30 ohms, a light transmission of 58%, and surface reflectivities of 17% and 10%. The product was tightly adherent and while thicker layers of lead oxide might be used there is not found any further improvement in adhesion but as the lead oxide layers become thicker there is a greater absorption of light. Thus, in the preceding example the coating of lead oxide approximates a one molecule thick layer and this is sufficient to secure the full adhesive effects and desirable formation of a uniform coating when the conducting metal is deposited thereupon. Thus the use of thicker layers of adhesive is unnecessary but a considerable thickness of many suitable materials may be employed without adverse effect. It is obvious that no particular careful control of the thickness of the adhesive layer need be exercised to secure the benefits of the invention.

*Examples 7 to 9*

Within a vacuum chamber a glow discharge electrode was hung which comprised a length of gold wire. Glass plates were set within the chamber at distances of 10, 14.1, and 17.3 inches away from a tungsten filament which carried a supply of silver for thermal evaporation. After the chamber was closed and evacuated to a range of residual air pressure suitable for sputtering such as between 2 millimeters and .01 millimeter pressure, an alternating high voltage current was passed between the gold electrode and the walls of the chamber by glow discharge to cause gold to sputter upon the glass plates. A voltage such as 15,000 volts with 5 kva. may be applied for a period of 10 minutes and after such treatment the glasses were found to be practically unaffected, but to show upon careful examination an extremely faint evidence of a slight amber tinge. Thus the light transmission of the coated glasses was practically unaffected and the layer produced thereon almost invisible. The layer adheres tightly to the glass and appears to be an oxide of gold when the sputtering is carried out in the chamber in which the gas contains oxygen such as from the residual air in the chamber. Upon the coated glasses there was evaporated .033 gram of silver which produced on the glass nearest the filament a film of silver of 96 Angstrom units thickness. On the other glasses the films were 48 and 32 Angstrom units thick. The three coated glasses thus produced were highly adherent and showed electrical conductivities and light transmission values and other optical properties as shown in the attached table, Figure 1. The product had an almost imperceptible blue-gray color due to the silver film. The product of Example 7 might readily be employed in a goggle whereas the other two products are more particularly useful in windows and windshields.

If a first layer is produced by sputtering the gold in the absence of oxygen such as in a residual hydrogen atmosphere, it is found that the initial deposit thereby produced wipes off of the glass readily and such a coating does not serve to adhere a subsequently applied film of silver. In this case it would seem that the sputtered coat is pure gold and such does not serve to produce the article of the invention whereas when the gold is sputtered in the presence of oxygen an oxide of gold which adheres to glass is formed.

*Examples 10 to 12*

Proceeding in a similar manner to the just above Examples 7 to 9, a loop of copper wire was substituted as the electrode for sputtering and the walls of the chamber were preliminarily coated with a copper deposit by thermal evaporation. When glasses were placed in this chamber at the same distances as before and the glow was carried out for 10 minutes, the resultant treated glasses showed no visible deposit thereon. However, the glasses carried a coating because upon the subsequent deposition of the same thicknesses of silver of 96, 48 and 32 Angstrom units, adhered products were secured in which the silver film was of a uniform thickness and of a maximum electrical conductivity and maximum light transmission. In contrast, if the same silver thicknesses were deposited directly upon glass without the sputter treatment, the silver deposits were loose, readily wiped away with the finger and were of extremely poor or of no electrical conductivity. Furthermore, the coatings showed colors varying from purples through greens and transmitted light was lost when the same was passed through it by scattering from the individual small grains which constituted such deposit.

Thus the preliminary sputtering of copper which produced an invisible coating of copper oxide on the glass formed an adherent layer on the glass which in turn permitted securing adhesion of the silver to the glass and the securing of the silver in a continuous uniform thicker coating. The electrically conducting transparent glasses thus produced had the properties shown in the attached table.

*Examples 13 and 14*

Proceeding as in the above Examples 7 to 9, a silver wire loop was substituted so that a silver sputtering might be carried out. During the sputtering of 10 minutes a light coating of silver oxide was formed directly during the sputtering in the residual air upon two glasses placed at 10 and 14.1 inches. On the two plates a very slight, hardly perceptible amber tint could be found on examination which indicated the presence of the silver oxide layer. This could not be rubbed off as it was tightly adherent to the glass. On top of this there was thermally evaporated .083 gram of silver to produce silver films on the two spaced glasses of 96 and 48 Angstrom units thickness. In the attached table there is shown the various physical properties of the produced articles and it will be noted upon examining the various examples where silver was employed as the conducting film, that in examples where the same was of the same thickness the general properties of the articles produced were approximately the same regardless of the adhesive layer employed or the method by which it was formed.

*Examples 15 to 20*

Three separate runs were made with two glasses each, the glasses being placed at 10 and 14.1 inches away from the tungsten evaporating filament. In each of the three runs the final metallic film which was applied was formed by evaporating .075 gram of copper, to produce on the nearest glass a film thickness of 48 Angstrom units. The sputter coat applied in the three separate runs differed only in the electrode provided for sputtering, in one case being a gold wire, in the second case a copper wire, and in the third case a silver wire loop. The sputtering was carried out as in the just above examples and the sputter coats had the same characterists as just above described. In this way there was prepared two glasses each having a sputter coat or adhesive layer of gold oxide, of copper oxide, and of silver oxide. The electrically conducting transmitting windows thus produced showed the properties given in the attached table. Each of the articles was characterized by high adhesion of the metal film to the glass and by reason of the uniform thickness of the copper layer, a relatively high electrical conductivity and absence from tendency to burn out by development of hot spots. All of the articles thus produced had a slightly imperceptible copper red tinge when looked through. In general the products are of about the same general properties of those having a comparable silver thickness although it is evident that the products are not quite as highly transparent or as highly conductive.

*Examples 21 to 25*

In a vacuum chamber which had previously been coated upon its walls with gold, a gold wire loop was positioned as an electrode for glow discharge. Glasses placed within the chamber at 10, 14.1, 17.3, and 20 inches were then coated with a sputter coat of gold oxide by having a glow discharge between the electrodes and the walls for 10 minutes in an air atmosphere at substantially 2 to 10 microns pressure, an electric current of 15,000 volts as applied dropped down to between 5,000 to 1,500 volts during the actual sputtering. The sputtered coat of an oxide of gold thus applied was tightly adhered and only very slightly apparent as extremely light amber tint when the glass was closely examined. Gold in the amount of .150 gram was then thermally evaporated upon the various glasses to give films of 96 Angstrom units, 48 Angstrom units, 32 Angstrom units, and 24 Angstrom units. The coated glasses had highly desirable properties for use as an electrically conducting transparent window or windshield as will be apparent upon examining the attached table.

A clear sheet of silica placed at 14.1 inches in carrying out the production of the above samples, was similarly given a coating of gold oxide by sputtering and a gold film of 48 Angstrom units. The product was equally as adherent and had generally the same properties as the product made with the ordinary glass, as can be readily seen in the attached table, Example 25.

The coated glasses, and silica in Examples 21 through 25, each had a very light pale yellowish tinge by transmission and a light reddish yellow shade by reflection of a characteristic gold color.

*Examples 26 and 27*

Proceeding as in the just previous example a product was produced carrying a similar sputter coat of gold oxide and a gold film of 40 Angstrom units thickness. The gold film was highly adherent and could be readily cleaned as was necessary before applying this window to the formation of a laminated windshield. The product was laminated with another uncoated glass using a plastic of the polyvinyl butyraldehyde type or of the polyvinyl ketal acetal type such as suggested in U. S. Patent 2,425,568. These plastics have a refractive index of 1.5. The laminating process was carried out as employed in that art and the product when subjected to impact tests standard in the safety glass industry, was found to show high adhesion between all layers so that the glass readily withstood an impact from a one-half pound steel ball dropped 16 feet. The lamination was made with the coated side of the glass inside the lamination and directly adjacent to the plastic surface. Thus, the adhesion between the metal oxide layer and the glass and the metal oxide and the metal, as well as between the metal and plastic were all of a very high degree and comparable with the safety glass adhesion qualities normally apparent between the plastic and uncoated glass surfaces. Various samples made this way showed a range in electrical resistance between 20 and 33 ohms with no change in resistance occurring upon lamination. An increase in light transmission and change in light reflective properties was found upon lamination, as will readily be seen in the attached table in which Example 26 is the glass before lamination and Example 27 is the laminated product. The products have a very faint yellowish tinge more or less like that normal to ordinary glass and to the untrained eye the safety glass appears indistinguishable from ordinary safety glass. The safety glass thus produced when installed in an airplane, automobile or train as a window or windshield, prevented ice or fog formation thereon when a suitable source of current was attached to leads along the side and passed through the metal film to generate heat therein.

*Examples 28 to 31*

A copper oxide sputter coat was formed upon glasses placed at four different distances away from an evaporation filament by the use of a copper wire loop as a glow electrode, and preferably in a chamber previously coated with a copper layer. Upon glowing or sputtering for periods of 10 to 60 minutes at pressure ranges between 3 and .7 microns, it was found that the sputter coat produced was tightly adherent and varied from a completely invisible coat to one just slightly apparent. When glasses so prepared were thereafter coated by evaporation of .150 gram of gold upon the glasses placed at 10, 14.1, 17.3, and 20 inches, to produce films of gold of 96 Angstrom units, 48 Angstrom units, 32 Angstrom units, and 24 Angstrom units thickness, there invariably resulted excellent substantially transparent, highly adherent, electrically conducting glasses with low resistance. The products had properties as shown in the attached table and the product with 96 Angstrom units thickness gold film was directly useful in goggles and the other products of 48 and 32 Angstrom units were particularly useful in windshields to prevent icing and fogging.

*Examples 32 to 34*

Employing a silver glow wire and sputtering for 10 minutes upon three glasses placed within a vacuum chamber there was produced an invisible coating of silver oxide. Upon this there was deposited a film of 96 Angstrom units of gold in one case, 64 Angstrom units in the second case, and 48 Angstrom units in the third case by properly positioning the glasses away from the evaporation filament. The products had properties as shown in the attached table.

*Examples 35 to 37*

A sputter coat of nickel oxide was formed by sputtering with a loop of nickel wire as an electrode and the coating after 40 minutes' sputtering was very slightly apparent. When gold was then deposited upon the glass pieces to produce respectively, a film of 96, 48 and 32 Angstrom units, the resultant products were highly adherent, good electrical conductors, and quite transparent as will appear from the attached table.

*Examples 38 to 40*

In the Examples 38, 39 and 40, in a similar manner a palladium oxide sputter coat was formed by glowing within a residual air vacuum employing a palladium wire loop electrode and sputtering for 10 minutes, a definite lightly apparent brown tinge was apparent upon the coated glasses. Upon this palladium oxide layer there was deposited sufficient gold to give on the three glasses a film thickness of 96, 48, and 32 Angstrom units. The products were highly adherent and showed suitable properties for electrically conducting windows as appears in the attached table.

*Examples 41 to 43*

By three successive thermal evaporations within a vacuum there was built up upon two sheets of glass a coating comprising aluminum, gold and aluminum. In one case the first aluminum layer was 56 Angstrom units thick, the gold film applied on top was 48 Angstrom units thick, and on top of the gold there was applied a second aluminum layer or coating 56 Angstrom units thick. On the other glass the initially deposited coating of aluminum was 9.3 Angstrom units thickness, the gold film 48 Angstrom units thickness, and the final aluminum overcoating 133 Angstrom units thickness. The first glass was then placed in a furnace at 700 degrees Fahrenheit and held there for 16 hours in order for oxygen to penetrate through the layers and to convert each of the aluminum layers to aluminum oxide. Similarly, the second glass was put in a furnace at 800 degrees for one-quarter hour in order to accomplish the same objectives. The resultant glass products thus provided an electrically conducting sheet of glass in which the gold firm was adhered to the glass by an aluminum oxide layer and further, the gold layer was protected on its outer surface by an aluminum oxide coating. The thickness of the various layers in the final product, and the physical properties of the products are shown in the attached table.

The first of the glasses thus prepared, constituting Example 41, was laminated with an uncoated glass using a soft plastic of approximately 1.5 refractive index to form a safety glass in which the coated side was placed next to the plastic. The laminated product as Example 43, showed the same electrical resistance of 60 ohms and a light transmission of 78%, and reflection values of 8.8 from the coated side and 9.2 from the uncoated glass sheet side. This product served admirably in windshields, windows and goggles as a non-fogging and non-icing window when electrical current was passed through the gold film.

*Examples 44 to 46*

It is apparent that the product of Examples 41 and 42 offer an advantage in the presence of an overlying protective coating which gives some protection to the softer gold films during the handling preceding the lamination operation. Additional protection might be secured by still further coatings as in the following examples, and further advantage may be secured in reducing the reflection values from the coated and laminated glass products.

Two glasses were made in which there were successively applied by thermal evaporation, layers of metallic aluminum, gold, metallic aluminum and silica. In the first of these the layers of aluminum were converted to aluminum oxide by heating at 800 degrees Fahrenheit in air for one-quarter hour, the original aluminum layers being so taken that the final aluminum oxide layers produced were each 7 Angstrom units thickness. The gold film employed was 48 Angstrom units thick and the exterior overlying silica coating was 225 Angstrom units thick. This product showed an electrical resistance of 30 ohms, a light transmission of 72%, and other optical properties as shown in the attached table. The second glass was similarly produced by the furnace treatment at 1,000 degrees instead of 800 degrees, and the final layer of aluminum oxide in contact with the glass was 14.5 Angstrom units thick, the gold layer was 40 Angstrom units thick, and this carried a layer of aluminum oxide of 7 Angstrom units thickness. Upon the latter there was a final coating of silica which was 450 Angstrom units thick. The coated plate thus produced had properties shown in the attached table and after being laminated into a safety glass with the silica adjacent to the plastic on the inside of the lamination, the laminated safety glass product thus produced showed substantially the same properties as indicated in Example 46 of the table. The laminated product was highly useful for service in an automobile or airplane for preventing condensation or freezing of moisture on the surface of the same when an electric current was passed through the coated glass to keep the same warm.

*Examples 47 and 48*

A layer of lead sulphide was produced on clear transparent pieces of silica, mica, borosilicate glass, lead glass and ordinary glass placed 24 inches away from the tungsten filament by evaporating .010 gram of lead sulphide. The coated glass pieces thus secured showed no visible signs of such deposition. The lead sulphide preliminary coating thus produced was about 3 Angstrom units thick. There was then thermally evaporated immediately upon this coating, a film of gold of 48 Angstrom units thickness. The products were in each case highly transparent and of good electrical conductivity and the properties shown with the sample made with an ordinary glass support are those tabulated in Example 47.

Similar products were made in which an equal weight of antimony sulphide was first evaporated on the various supports so as to produce similar coated articles. The products secured were in all cases highly adherent and generally like those secured with the lead sulphide layer. In general, the metallic sulphides were found to give equally high adhesion of the metal films to the transparent siliceous supports, and also were found to provide a surface upon which the metals would deposit to give a continuous uniform thickness film.

*Example 49*

An ordinary piece of glass was coated as under the Example 47, but the amount of lead sulphide evaporated was .025 gram. After the evaporation the vacuum pumps were stopped and air was let into the vacuum chamber, and after a few moments the vacuum pumps were again started. A thin layer of lead sulphate was formed by oxidation of the lead sulphide. The lead sulphate layer would appear to have been of about 11 Angstrom units thickness. The oxidation of the lead sulphide layer to lead sulphate may also be accomplished without removing the piece from the vacuum chamber, by introducing air or oxygen into the chamber after the lead sulphide has been deposited, until a sufficient pressure has been built up which will permit an electric glow discharge to pass through the gases within the chamber. After a short time the electric glow discharge, in combination with the oxygen present, converts the lead sulphide to lead sulphate. After thus forming a lead sulphate layer upon the glass there was then deposited by thermal evaporation, a film of gold of 40 Angstrom units thickness. The product produced had excellent properties as a window which could be heated by electricity passing through the metal film, the physical properties being as shown in the attached table. The product was highly adherent and from this a laminated safety glass could be made.

*Example 50*

A vacuum chamber was preliminarily coated with iron upon the walls of the chamber by thermally evaporating iron within the chamber. The chamber was then opened and clean pieces of glass were placed therein and the chamber evaporated to a sputtering pressure. A high voltage A. C. electric current was applied to the iron coated walls of the chamber as one electrode and to an insulated aluminum disc as the second electrode. After ten minutes of sputtering thus produced there was no visible coating upon the glass. However, the glass was coated with a thin coating of iron oxide. The vacuum was then pulled down to $10^{-4}$ millimeters and there was thermally evaporated a small quantity of iron so as to produce upon the glass a coating of iron of 48 Angstrom units thickness. When the glass was removed from the chamber the iron coating was of a gray color by light transmission and was found to transmit 50% of the light. The coating was highly adherent and thereby indicated the presence of the iron oxide adhesive layer between the iron and the glass. The electrical conductivity and other properties of the sample thus produced are shown in the attached table of Figure 2.

*Example 51*

A thin layer of aluminum oxide 30 Angstrom units thick was deposited on a support glass by thermal evaporation and thereafter a film of gold of 150 Angstrom units thickness was similarly deposited by thermal evaporation. This gave a strongly adherent electrically conducting glass from which the metal film could not be pulled off the glass by adhesive tape. While the thin aluminum oxide thus gave a high degree of adhesion to the product, it did not interfere with or alter the reflective properties of the product. The windows thus produced had excellent properties suiting them for use as an electrically conducting glass as shown in the attached table, the resistance being only 2 ohms per square, and transparency being 50%.

*Example 52*

Within a vacuum chamber clear glass was exposed to a sputtering treatment in a residual air atmosphere to produce thereon a thin invisible coating of copper oxide. The electrodes used in sputtering comprised two separate copper electrodes insulated from the walls and suitable A. C. current was passed through the same for a period of 10 minutes. The glass so precoated was then given a coating of 72 Angstrom units thickness of nickel by thermally evaporating nickel from a tungsten filament after the vacuum had been improved to approximately $10^{-4}$ millimeters. The product so produced had a light transmission of 50%, was of a light gray color by transmission, and had an electrical resistance of 140 ohms. From the coated side it showed a reflectivity of 21% and from the uncoated side it showed a reflectivity of 9%. The article was highly adherent and quite useful directly as a goggle lens, to which a low voltage electrical source was attached.

What we claim as our invention is:

1. An electrically conductive transparent article comprising: a body of transparent glassy siliceous material having a smooth continuous surface; a continuous intermediate transparent adhesive layer deposited by molecular deposition on said smooth continuous surface, said layer comprising a metallic oxide characterized by strong molecular adhesion both to glassy siliceous material and to metals, the adjacent surfaces of said body and layer being in continuous direct surface to surface contact and defining a smooth continuous interface; and a continuous film of a metal selected from the group consisting of gold, silver, copper, iron and nickel deposited by molecular deposition on said adhesive layer and permanently and directly adhered throughout its area to said adhesive layer by molecular forces, said film being substantially uniform in thickness, the thickness of said film being such that it has an electrical resistivity of not more than 150 ohms per square area and the light transmission of the article is at least 50%, the outer surface of said metal film being substantially smooth.

2. An article as defined in claim 1 in which the adhesive layer is a gold oxide.

3. An article as defined in claim 1 in which the adhesive layer is an aluminum oxide.

4. An article as defined in claim 1 in which the adhesive layer is a copper oxide.

5. An article as defined in claim 1 in which the metal film is gold.

6. An article as defined in claim 1 in which the metal film is copper.

7. An article as defined in claim 1 in which the metal film is silver.

8. An article as defined in claim 1 in which the metal film is nickel.

9. An article as defined in claim 1 in which the metal film is iron.

10. An article as defined in claim 1 in which the metal film is between 20 and 150 Angstrom units in thickness.

11. An article as defined in claim 1 in which the electrical resistance is not greater than 25 ohms per square area.

12. An article as defined in claim 1 in which light transmission of the article is at least 70%.

13. An article as defined in claim 1 in which the adhesive layer is of a thickness invisible to the eye.

14. An article as defined in claim 1 in which the adhesive layer is at least two Angstrom units thick.

15. An article as defined in claim 1 in which the article is a pane of glass which is laminated to a second pane of glass with an intermediate ply of plastic in contact with the coated side of the first pane.

16. An article as defined in claim 1 in which the metal film has applied thereover an adherent protective film of a hard metallic oxide.

17. An article as defined in claim 1 in which the metal film has applied thereover a second adhesive film of a metal oxide, and a protective coating of silica, the second adhesive film serving to adhere the silica to the metal film.

18. An article as defined in claim 1 in which the metal film is a thermally evaporated deposit.

19. An article as defined in claim 1 in which the metal film is a sputter deposit.

20. An article as defined in claim 1 in which the metal film is gold and in which a protective coating of magnesium fluoride is adhered over the gold film.

WILLIAM H. COLBERT.
ARTHUR R. WEINRICH.
WILLARD L. MORGAN.

REFERENCES CITED

The following references are of record in the file of this patent:

UNITED STATES PATENTS

| Number | Name | Date |
|---|---|---|
| 2,021,661 | Kisfaludy | Nov. 19, 1935 |
| 2,079,784 | Williams | May 11, 1937 |
| 2,215,048 | McGregor et al. | Sept. 17, 1940 |
| 2,304,182 | Lang | Dec. 8, 1942 |
| 2,429,420 | McMaster | Oct. 21, 1947 |
| 2,482,054 | Colbert et al. | Sept. 13, 1949 |